(12) United States Patent
Cox

(10) Patent No.: US 7,765,548 B2
(45) Date of Patent: Jul. 27, 2010

(54) SYSTEM, METHOD AND MEDIUM FOR USING AND/OR PROVIDING OPERATING SYSTEM INFORMATION TO ACQUIRE A HYBRID USER/OPERATING SYSTEM LOCK

(75) Inventor: Alan Cox, Wales (GB)

(73) Assignee: Red Hat, Inc., Raleigh, NC (US)

( * ) Notice: Subject to any disclaimer, the term of this patent is extended or adjusted under 35 U.S.C. 154(b) by 1562 days.

(21) Appl. No.: 11/059,564

(22) Filed: Feb. 17, 2005

(65) Prior Publication Data

US 2006/0184942 A1 Aug. 17, 2006

(51) Int. Cl.
*G06F 9/46* (2006.01)
(52) U.S. Cl. ...................................... 718/100
(58) Field of Classification Search .................. 718/100
See application file for complete search history.

(56) References Cited

U.S. PATENT DOCUMENTS

| | | | |
|---|---|---|---|
| 5,553,239 | A | 9/1996 | Heath et al. |
| 5,828,876 | A | 10/1998 | Fish et al. |
| 6,223,204 | B1 | 4/2001 | Tucker |
| 2002/0099867 | A1 | 7/2002 | Wilkinson et al. |
| 2005/0081204 | A1* | 4/2005 | Schopp .................. 718/100 |

OTHER PUBLICATIONS

Franke, et al., "Fuss, Futexes and Furwocks: Fast Userlevel Locking in Linux", Proceedings of the Ottawa Linux Symposium, Jun. 26-29, 2002.
European Search Report issued for EP 06250822.1-14243, dated Oct. 2, 2007.
Schimmel, Curt. "UNIX Systems for Modern Architectures." Addison Wesley, ISBN 020163388.
Drepper, Ulrich. Dec. 13, 2004. "Futexes are Tricky." http://people.redhat.com/drepper/futex.pdf.
Adams, Steve. Oct. 1999. *Oracle8i Internal Services: for Waits, Latches, Locks, and Memory*. O'Reilly & Associates, Inc. Sebastopool, California.
Shah, Jay. 1991. "VAXclusters and Other High-Availability Systems." *VAXclusters: Architecture, Programming and Management*. McGraw-Hill, Inc. p. 57-99.
Kenah, Lawrence J. et al. 1984. "VAX/VMS Lock Manager." *VAX/VMS Internals and Data Structures*. Digital Press. p. 244-263.
http://lse.spurceforge.net/io/aio.html.
http://redhat.com/whitepapers/rha/gfs/GFS_INS0032US.pdf.

* cited by examiner

*Primary Examiner*—Meng-Ai An
*Assistant Examiner*—Eric C Wai
(74) *Attorney, Agent, or Firm*—Wilmer Cutler Pickering Hale and Dorr LLP

(57) ABSTRACT

A system, method and medium for utilizing data indicative of operating system activity to determine if a process should continue to attempt to acquire a lock, or make a call to an operating system.

21 Claims, 6 Drawing Sheets

SYSTEM, METHOD AND MEDIUM FOR USING AND/OR PROVIDING OPERATING SYSTEM INFORMATION TO ACQUIRE A HYBRID USER/OPERATING SYSTEM LOCK

BACKGROUND OF THE INVENTION

1. Field of the Invention

The present invention generally relates to a system, method and medium for improving the acquisition time for acquiring a lock and, more particularly, to a system, method and medium for using and/or providing operating system information to acquire a hybrid user/operating system lock.

2. Background Description

FIG. 1, generally at 100, is a conventional computer system that shows the relationship between application programs 101a-n, kernel 105, and hardware 107. Application programs 101a-n can include, for example, conventional word processing, graphic and/or web browser programs, that directly interact with an end user. Application programs 101a-n are executed in user-space 103, and can be referred to as "processes," or "tasks" when program instructions are executed by the central processing unit (CPU) (not shown).

Kernel 105 includes system call interface 109, kernel subsystems 111, and device drivers 113. Application programs 101a-n communicate with kernel 105 by making a conventional system call. System call interface 109 can receive requests from processes to access hardware 107 such as printers, monitors, storage devices and/or network devices. Kernel 105 can execute these requests via kernel subsystems 111 and device derivers 113 in a conventional manner. Kernel subsystems 111 can also include interrupt handlers to service interrupt requests, a memory management system to manage address spaces, and system services such as networking and interprocess communication (IPC).

When performing, for example, conventional asynchronous input-output (AIO) between application programs 101a-n and kernel 105, application programs 101a-n invoke a system call to kernel 105 to initiate each input-output (I/O). For example, application program 101a-n typically calls a function in a library, such as a C library, that in turn relies on system call interface 109 to instruct kernel 105 to conduct one or more tasks on its behalf. When a system call takes place, an application program 101a-n that makes the call is suspended, and the kernel 105 takes over. The context switch from the application program 101a-n to kernel 105 is costly in terms of performance, as system calls can take, for example, 10 to 1000 times more processing time than a normal processing operation, such as a CPU adding two numbers together.

Conventional techniques of acquiring a lock can be done in user-space 103 where, for example, an application program 101a-n acquires a lock, or by the kernel 105, where the kernel 105 acquires a lock. As used herein, a lock is used to deny access to a given resource, such as a file, memory location, input/output port, and the like, usually to ensure that only one application program 101a-n, and/or process associated therewith, at a time uses the resource.

Although user-space 103 will typically acquire a lock more quickly than kernel 105, user-space 103 does not know, for example, the overall state of the various processes and threads being executed and/or managed by kernel 105. On the other hand, although kernel 105 knows the overall state of the various processes and threads being executed and/or managed by kernel 105, an application program 101a-n call into kernel 105, as indicated above, typically takes at least an order of magnitude more processing time to acquire a lock than if application program 101a-n requests a lock and acquires the lock without making a call to kernel 105. If application program 101a, requests a lock and does not acquire the lock, application program 101a, short of making a call to kernel 105, can keep attempting to acquire the lock. However, using known techniques, application program 101a cannot tell if it cannot obtain the lock because, for example, another program (e.g., application program 101c) is being executed on (or by) the same processor has the lock, or because another program (e.g., application program 101d) being executed on (or by) another processor in a multiprocessor system has the lock.

One conventional technique attempts to reduce the number of system calls by having application program 101a-n first attempt to acquire a lock in user-space 103. If the lock, after one or more attempts, is not acquired in user-space 103, application program 101a-n then makes a call to kernel 105. However, in using this technique, kernel 105 does not make information available to a memory space that is shared by application program 101a-n and kernel 105, so that application program 101a-n can use the information to determine the state and/or status of various processes, tasks, etc. being processed by, or waiting to be processed by, kernel 105.

SUMMARY OF THE INVENTION

In one embodiment embodiments of the present invention, a system, method and medium are provided for utilizing data indicative of operating system scheduling in shared user-operating system memory space. The method includes the steps of providing, by the operating system, data to a shared user-operating system memory space indicative of scheduled operating system activities. An attempt by a user process to acquire a lock is detected, wherein, upon the user process not being able to acquire the lock, the user process reads the data. The operating system receives a call from the user process when the number of operating system activities exceeds a predetermined number. If the number of processes scheduled to run does not exceed a predetermined number, the user process attempts a second time to acquire the lock.

In another embodiment of the present invention, a system, method and medium are provided for utilizing data that is not indicative of operating system scheduling in shared user-operating system memory space. In this embodiment, the purpose for utilizing data that is not indicative of operating system scheduling may be to facilitate operation in accordance with kernel policy. For example, if kernel resides on a laptop computer, kernel policy may be to conserve battery power, possibly at the expense of kernel efficiency. In this case, by kernel providing more data indicative of operating system activities than is actually occurring, a process may make a kernel call, rather than keep spinning, in order to save battery power.

This method also includes detecting an attempt by a user process to acquire a lock, wherein, upon the user process not being able to acquire the lock, the user process reads the data. The operating system receives a call from the user process when the number of operating system activities exceeds a predetermined number. If the number of processes scheduled to run does not exceed a predetermined number, the user process attempts a second time to acquire the lock.

The operating system may operate in the context of a single processor system, or a multiprocessor system. In the case of a multiprocessor system, data in the shared user-operating system memory space is indicative of scheduled operating system activities for each processor of the multiprocessor system. The kernel of the operating system can provide the data to the shared user-operating system memory space.

There has thus been outlined, rather broadly, the features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other features of the present invention will be evident to those of ordinary skill, particularly upon consideration of the following detailed description of the embodiments.

BRIEF DESCRIPTION OF THE DRAWINGS

The detailed description of the present application showing various distinctive features may be best understood when the detailed description is read in reference to the appended drawing in which.

DETAILED DESCRIPTION OF EMBODIMENTS

Figure 2A:
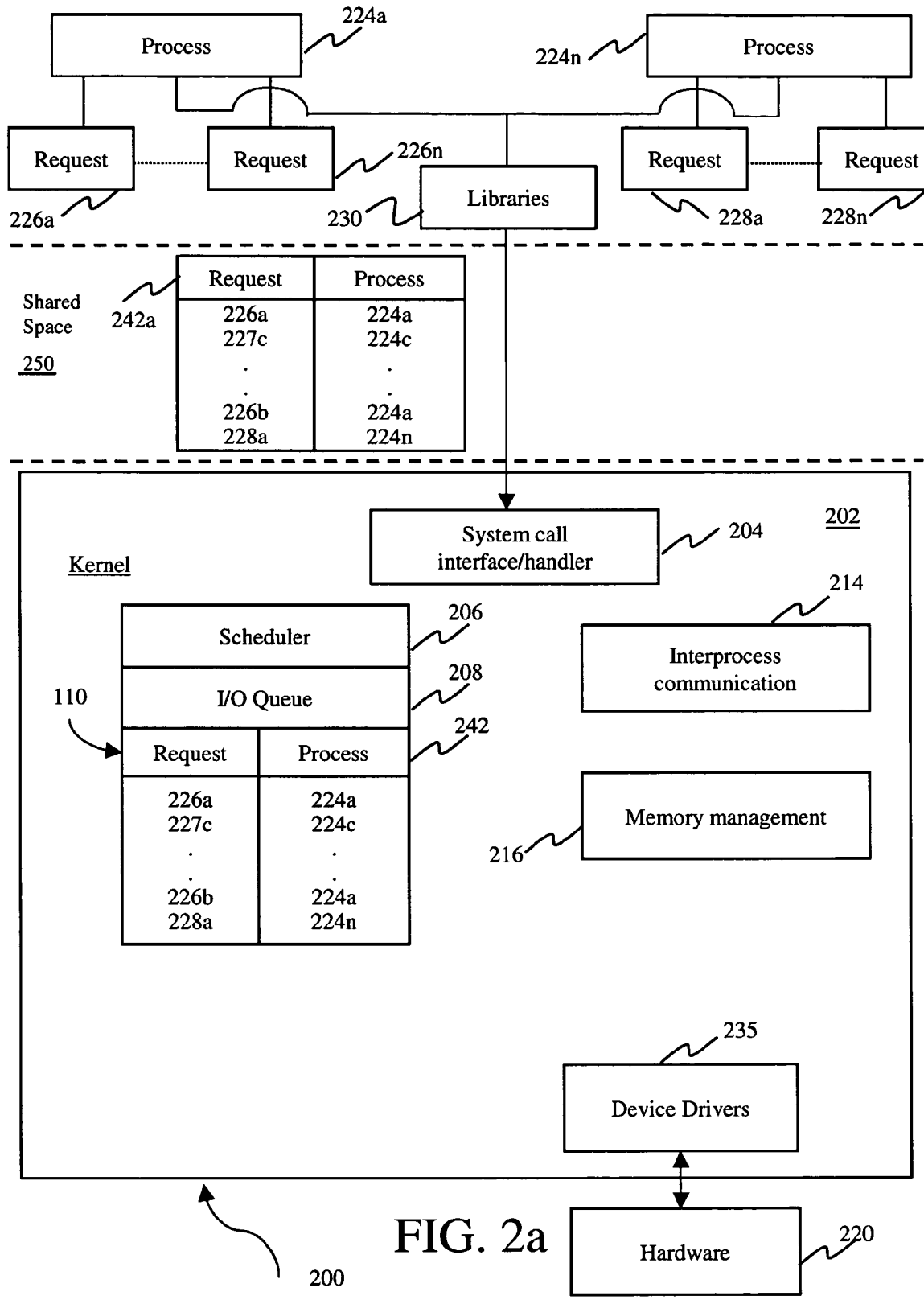
FIG. 2a is a diagram of an exemplary architecture in accordance with an embodiment of the present invention.

FIG. 2a, generally at 200, is a diagram of an exemplary architecture in accordance with an embodiment of the present invention. Processes 224a-n represent various end-user application processes associated with various end-user application programs. For example, processes 224a can represent various processes of a standard word processing program such as Microsoft Word. As used herein, a process is an active program and related resources that may include, for example, open files and associated signals, an address space, and/or one or more threads of execution.

Kernel 202 is a module of the operating system that loads and remains in main memory. Kernel 202 is responsible for handling system calls, scheduling and handling completion of tasks, inter-process communication, memory management, managing input and output from hardware (such as printers, keyboards, and a mouse), and providing a copy of or data pertaining to request/process 242 to shared user-kernel space 250.

Scheduler 206 is responsible for controlling process access to the central processing unit(s) (CPU(s) of a computer (not shown)). Scheduler 206 can enforce a policy that ensures that processes 224a-n will have access to the CPU, while ensuring that other kernel subsystems (e.g., interprocess communication 214, memory management 216, device drivers 235) are afforded adequate CPU processing time. For example, scheduler 206 may be responsible for ensuring that hardware 220 actions are performed by device drivers 235 in a timely manner. In connection with I/O queue 208, scheduler 206 can utilize any known scheduling technique, such as round robin scheduling, scheduling by task priority, and/or scheduling by the shortest task first.

In one or more embodiments of the present invention, scheduler 206 provides an interface for user processes 224a-n to register for timer notification. This leads to a flow of control from scheduler 206 to the user processes. Finally, scheduler 206 communicates with the CPU(s) (not shown) to suspend and resume processes. The CPU(s) is responsible for interrupting the currently executing process and allowing kernel 202 to schedule another process.

Memory management 216 permits multiple processes 224a-n to securely share the main memory system of a computer, and supports virtual memory operations that accommodates, for example, a process (e.g., process 224a) that utilizes more memory than is available in the computer.

Interprocess communication (IPC) 214 can utilize known IPC mechanisms (e.g., pipes, sockets, and/or streams) to enable one process to communicate with another process. There are at least two reasons why processes may need to communicate. One is data transfer, where one process needs to transfer data to one or more other processes. The second reason is synchronization. For example, IPC 214 can coordinate processing of process 224a and process 224d, where process 224a may require that process 224d prepares data for it before it can continue executing. Device drivers 235 can communicate with hardware 220 through standard device registers (e.g., status, control, and data device registers) to transfer data between the hardware 220 and kernel 202.

In accordance with one or more embodiments of the invention, a user process 224a-n can add one or more requests in request/process 242 to I/O queue 208. For example, the application program associated with the process can, for example, complete fields of a new request (e.g., 226a), and add request 226a to I/O queue 228. Thus, in FIG. 2a, request/process 242 may contain, for example, request 226a associated with process 224a, request 227c associated with process 224c, request 226b associated with process 224a, etc. In a standard manner, kernel 202 can also add other tasks to request/process 242 that do not, for example, directly originate from process 224a-n. Each request preferably is attached atomically to I/O queue 208.

In one or more embodiments of the invention, kernel 202 makes available a copy 242a of request/process 242 to shared user-kernel space 250. In this manner, process 224a-n is made aware, for example, of the various processes and threads being executed and/or managed by kernel 202. In accordance with kernel 202 policy, process 224a-n can read, access and utilize request/process 242a to determine whether one or more of process 224a-n should, for example, keep spinning, go to sleep, or make a call to kernel 202.

More particularly, as an example of kernel 202 policy, suppose process 224b attempts to acquire a particular memory space (e.g., a memory address or range of addresses), and there are one or more processes that have already requested the memory space. In such a case, the process may make a call to kernel 202, knowing that a queue having one or more processes wishing to acquire the memory space already exists. On the other hand, suppose process 224b attempts to acquire a particular memory space (e.g., a memory address or range of addresses), and there are no processes that are queued to acquire the desired memory space. In such a case, the process may spin in shared space 250, thereby avoiding a call to kernel 202.

Figure 1:
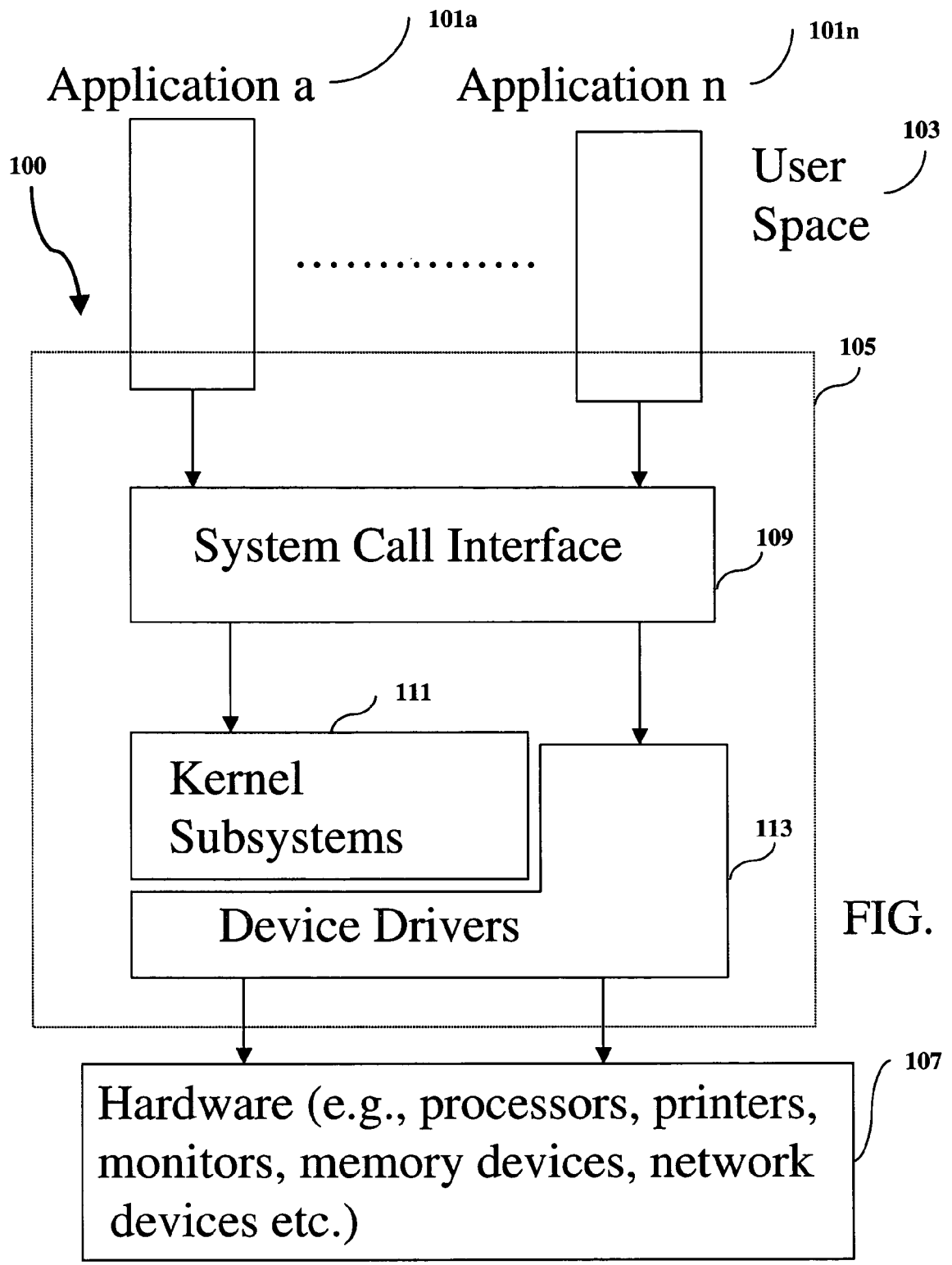
FIG. 1 is a diagram of an exemplary conventional operating system user space and kernel space.
Figure 2B:
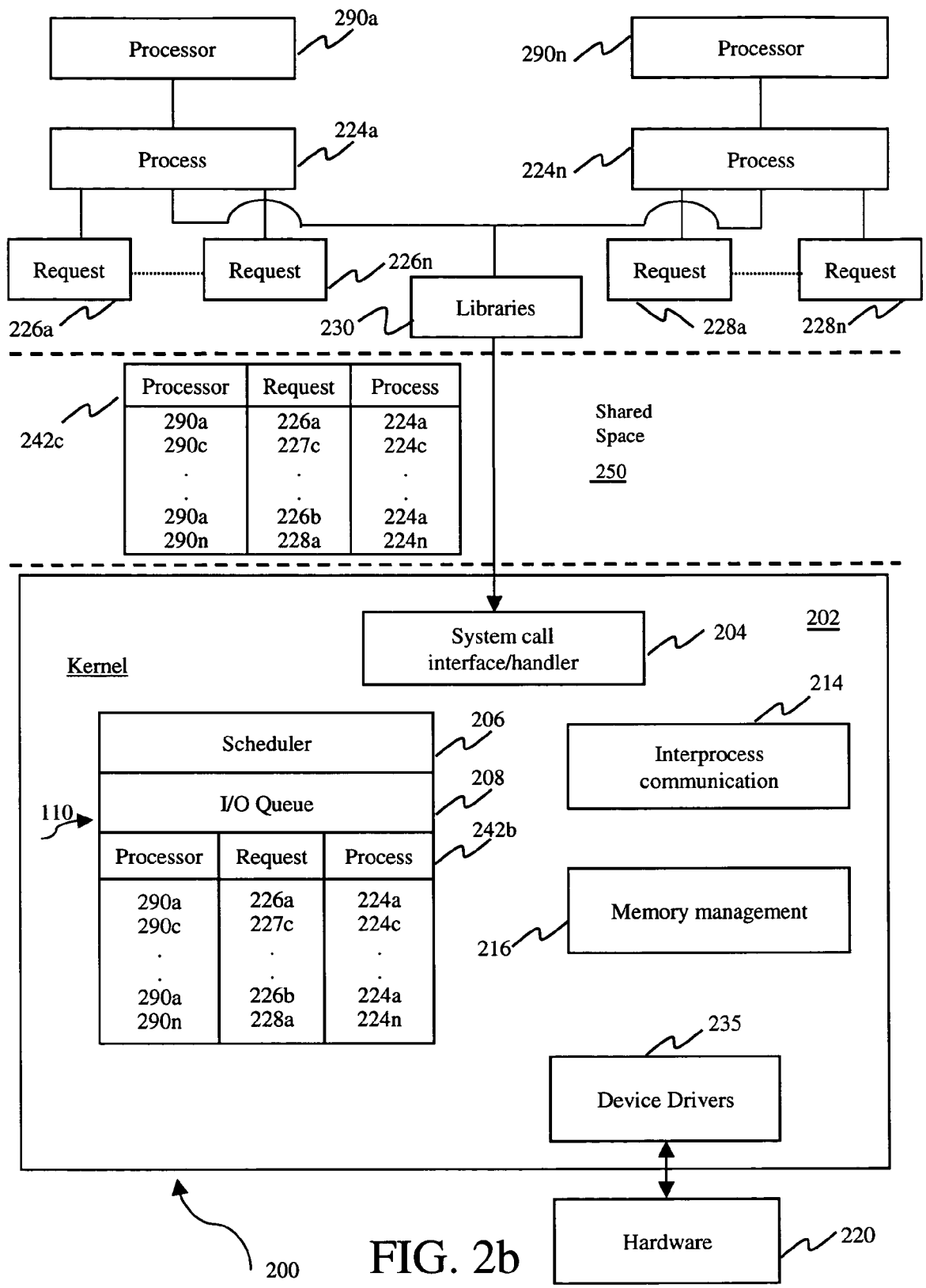
FIG. 2b is a second diagram of an exemplary architecture in accordance with an embodiment of the present invention.

FIG. 2b is a second diagram of an exemplary architecture in accordance with an embodiment of the present invention. FIG. 2b indicates that the present invention can also be used in the context of a multiprocessor system, as indicated, for example, by processor 290a-n, and processor/request/process 242b. More than one process (e.g., process 224a-d) can be associated with a single processor (e.g., processor 290a). In this case, kernel 202 maintains processor/request/process 242b with respect to each one of processors 290a-n, and makes available a copy 242c of processor/request/process 242b in shared user-kernel space 250. In this manner, process 224a-n is made aware of, for example, the various processes and threads being executed and/or managed by kernel 202. In accordance with kernel 202 policy as, for example, described above, process 224a-n can read and use request/process 242c to determine whether one or more of process 224a-n should, for example, keep spinning, go to sleep, or make a call to kernel 202, in a manner as described with reference to FIG. 1a.

Figure 2C:
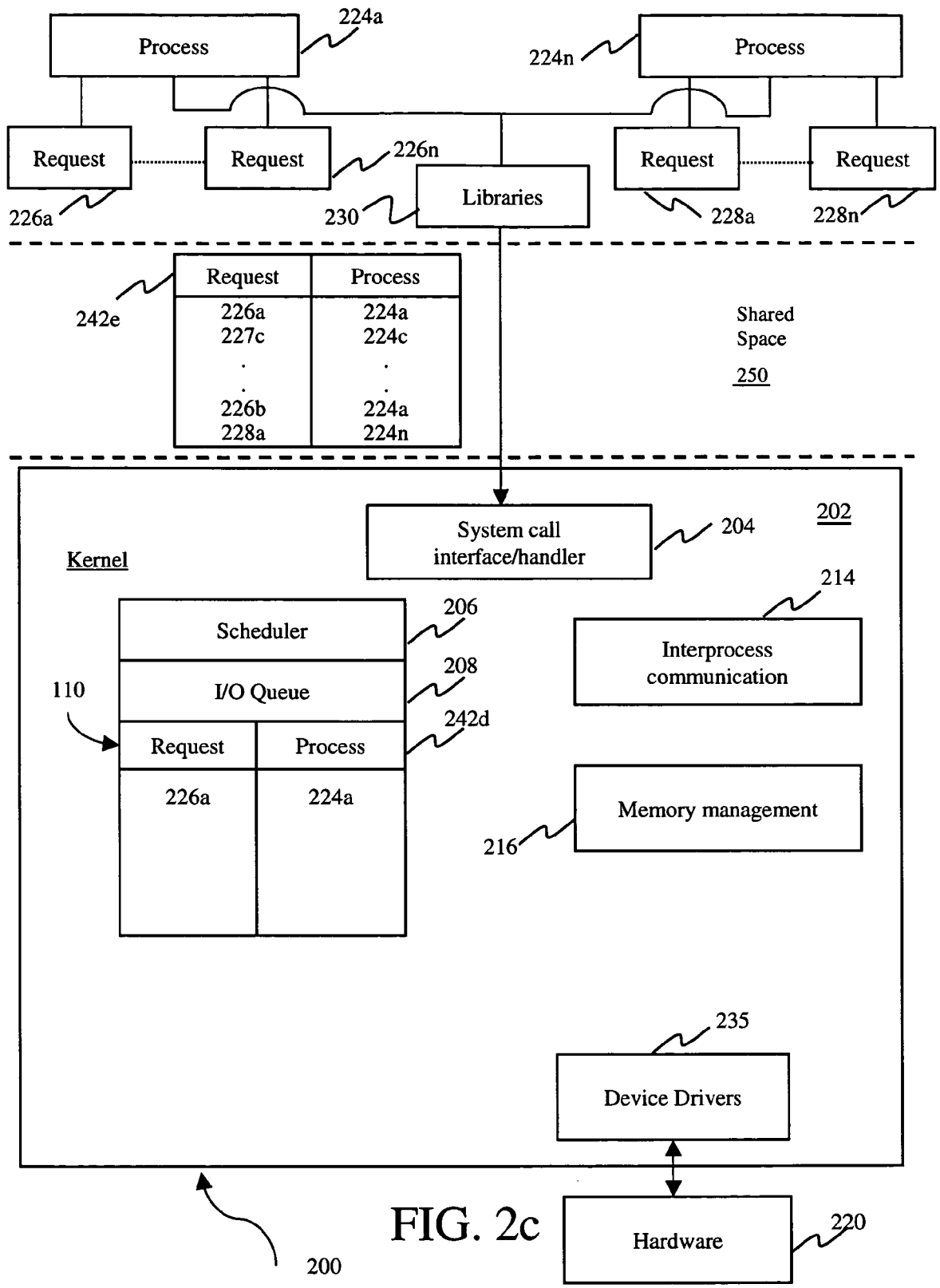
FIG. 2c is a third diagram of an exemplary architecture in accordance with an embodiment of the present invention.

FIG. 2c is a third diagram of an exemplary architecture in accordance with an embodiment of the present invention. FIG. 2c indicates that kernel 202 makes available a version 242e of request/process 242d to shared user-kernel space 250. In accordance with kernel 202 policy as, for example, described above, process 224a-n can read and use request/process 242e to determine whether one or more of process 224a-n should, for example, keep spinning, go to sleep, or make a call to kernel 202.

In this embodiment, kernel 202 is providing to shared space 250 a version 242e of request/process 242d that is different than the actual content of request/process 242d. The purpose for doing so may be so that processes 224a-n operate in accordance with kernel 202 policy. For example, if kernel 202 resides on a laptop computer, kernel 202 policy may be to conserve battery power, possibly at the expense of kernel 202 efficiency. In this case, by kernel 202 providing more data in request/process 242e than is in request/process 242d, process 224a-n will make a call to kernel 202, rather than keep spinning, thus saving battery power.

Figure 2D:
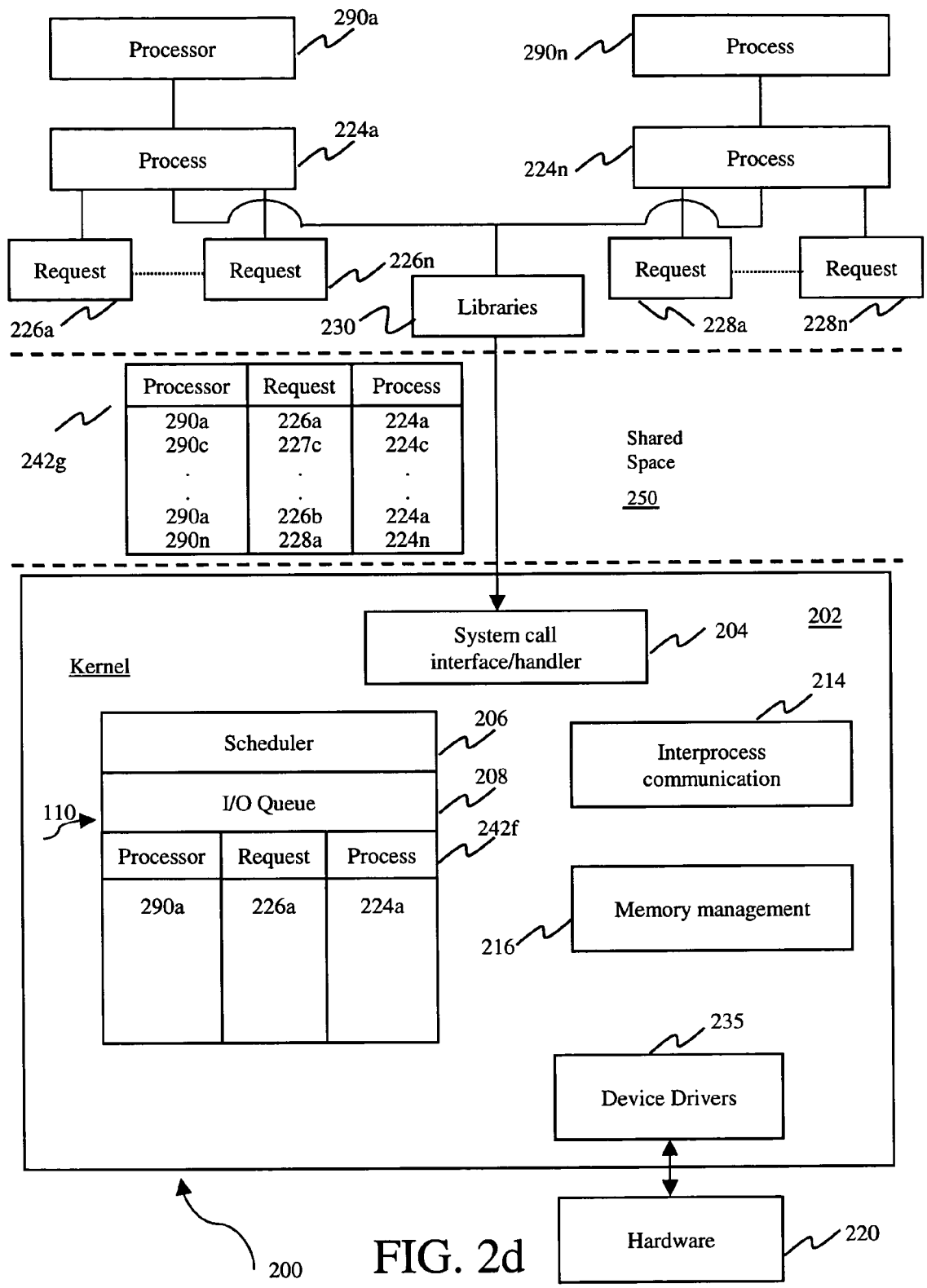
FIG. 2d is a fourth diagram of an exemplary architecture in accordance with an embodiment of the present invention.

FIG. 2d is a fourth diagram of an exemplary architecture in accordance with an embodiment of the present invention. FIG. 2d is another embodiment of the present invention can also be used in the context of a multiprocessor system, as indicated, for example, by processors 290a-n, and processor/request/process 242f and 242g. More than one process (e.g., process 224a-d) can be associated with a single processor (e.g., processor 290a). In this case, kernel 202 makes available a version 242g of processor/request/process 242f to shared user-kernel space 250. In accordance with kernel 202 policy, process 224a-n can read and use processor/request/process 242g to determine whether one or more of process 224a-n should, for example, keep spinning, go to sleep, or make a call to kernel 202.

In this embodiment, kernel 202 is providing a version 242g of processor/request/process 242f that is different than the actual content of processor/request/process 242f. The purpose for doing so may be so that processes 224a-n operate in accordance with kernel 202 policy. For example, if kernel 202 is operating on a laptop computer, kernel 202 policy may be to conserve battery power, possibly at the expense of kernel 202 efficiency. In this case, by kernel 202 providing more data in processor/request/process 242g than is in processor/request/process 242f, process 224a-n will make a call to kernel 202, rather than keep spinning.

Figure 3:
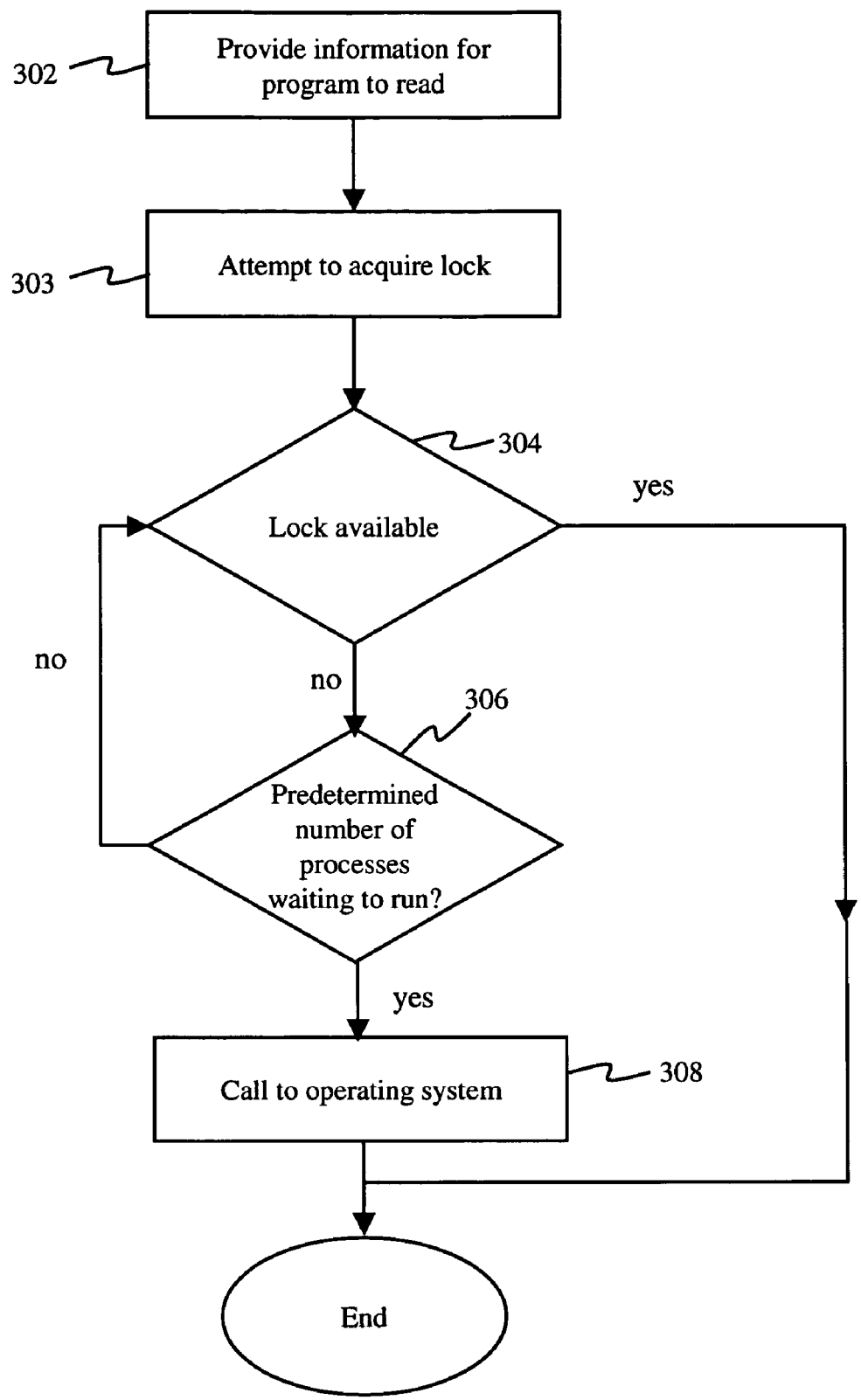
FIG. 3 is flow diagram illustrating an exemplary method of reducing system calls in accordance with an embodiment of the present invention.

FIG. 3 is flow diagram illustrating an exemplary method of reducing system calls in accordance with an embodiment of the present invention. At step 302, kernel 202 provides information, such as tables 242a, 242c, 242e and 242g respectively shown in FIGS. 2a-d, to shared space 250. At step 303, one or more processes 224a-n attempts to acquire a lock. At decision step 304, kernel 202 determines if a lock requested by a particular process (e.g., 224c) is available. If the lock is available, the method ends. If, at decision step 304, kernel 202 determines that a lock is not available, then, at decision step 306, process 224c determines, from reading a respective one of tables 242a, 242c, 242e and 242g, respectively shown in FIGS. 2a-d, if one or more other processes are waiting to run. If a predetermined number of other processes are waiting to run, the process 224c makes a call to kernel 202, and the method ends. If, at decision step 306, there are less than the predetermined number of processes waiting to run, process 224c returns to decision step 304.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for utilizing data indicative of operating system scheduling in shared user-operating system memory space, comprising:

providing, by the operating system, data to a shared user-operating system memory space that is indicative of scheduled operating system activities, the data representing requests made by processes, the data being assessable by a user process so that the user process can make a determination as to how to acquire a lock;

detecting, by the operating system, an attempt to acquire the lock by the user process; and receiving a call by the operating system, subsequent to said detecting step, from the user process when the number of scheduled operating system activities exceeds a predetermined number, the user process deciding to make the call based on the data in the shared user-operating system memory space, the user process making a second attempt to acquire the lock when the number of scheduled operating system activities does not exceed the predetermined number, the user process deciding to make the second attempt based on the data in the shared user-operating system memory space, wherein the data provided to the shared user-operating system memory space comprises a copy of user-process requests in an I/O queue of the operating system.

2. The method of claim 1, wherein the operating system operates in conjunction with a multiprocessor system.

3. The method of claim 2, wherein the data in the shared user-operating system memory space is indicative of scheduled operating system activities for each processor of the multiprocessor system.

4. A method of utilizing data provided by an operating system to shared user-operating system memory space, comprising:
   storing a version of data representing a number of actual scheduled operating system activities;
   providing, by the operating system, data representing a number of operating system activities to a shared user-kernel memory space that is not indicative of the number of actual scheduled operating system activities, the data to the shared user-kernal memory space being operative to represent a greater number of operating system activities than the version of data representing the number of actual scheduled operating system activities;
   detecting, by the operating system, an attempt to acquire a lock by a user process; and
   receiving a call by the operating system, subsequent to said detecting step, from the user process when the number of operating system activities represented by the data to the shared user-kernal memory space exceeds a predetermined number, the user process making a second attempt to acquire the lock when the number of scheduled operating system activities represented by the data to the shared user-kernal memory space does not exceed the predetermined number.

5. The method of claim 4, wherein the operating system operates in conjunction with a multiprocessor system.

6. The method of claim 5, wherein the data in the shared user-operating system memory space represents operating system activities for each processor of the multiprocessor system.

7. The method of claim 4, wherein the data to the shared user-kernal memory space is assessable by the user process to make a determination to call the operating system.

8. A computer program product residing on a computer storage medium, the computer program product comprising instructions for causing a computer to: provide, by an operating system, data to a shared user-operating system memory space storage that is indicative of scheduled operating system activities, the data representing requests made by the processes, the data being assessable by a user process so that the user process can make a determination as to how to acquire a lock;
   detect, by the operating system, an attempt by a user process to acquire the lock; and
   (i) receive a call by the operating system, subsequent to an attempt by the user process to acquire the lock, from the user process when the number of scheduled operating system activities exceeds a predetermined number, the user process deciding to make the call based on the data in the shared user-operating system memory space, and
   (ii) make, by the user process, a second attempt to acquire the lock when the number of scheduled operating system activities does not exceed a predetermined number, the user process deciding to make the second attempt based on the data in the shared user-operating system memory space, wherein the data provided to the shared user-operating system memory space comprises a copy of user-process requests in an I/O queue of the operating system.

9. The computer program product of claim 8, wherein the operating system operates in conjunction with a multiprocessor system.

10. The computer program product of claim 9, wherein the data in the shared user-operating system memory space is indicative of scheduled operating system activities for each processor of the multiprocessor system.

11. A computer program product residing on a computer storage medium, the computer program product comprising instructions for causing a computer to:
   store a version of data representing a number of actual scheduled operating system activities;
   provide, by an operating system, data representing a number of operating system activities to a shared user-operating system memory space, that is not indicative of the number of actual scheduled operating system activities, the data to the shared user-operating system memory space being operative to represent a greater number of operating system activities than the version of data representing the number of actual scheduled operating system activities;
   detect, by the operating system, an attempt by a user process to acquire a lock; and
   receive a call by the operating system, subsequent to an attempt by the user process to acquire the lock, from the user process when the number of operating system activities represented by the data to the shared user-operating system memory space exceeds a predetermined number, the user process making a second attempt to acquire the lock when the number of scheduled operating system activities represented by the data to the shared user-operating system memory space does not exceed the predetermined number.

12. The computer program product of claim 11, wherein the operating system operates in conjunction with a multiprocessor system.

13. The computer program product of claim 12, wherein the data in the shared user-operating system memory space represents operating system activities for each processor of the multiprocessor system.

14. The computer program product of claim 11, wherein the data to the shared user-operating system memory space is assessable by the user process to make a determination to call the operating system.

15. A system for utilizing data indicative of operating system scheduling in shared user-operating system memory space, comprising:
   an operating system;
   a shared user-operating system memory space comprising data indicative of scheduled operating system activities, the data containing requests made by processes, the data being assessable by a user process so that the user process can make a determination as to how to acquire a lock, wherein the operating system (i) receives a call from a user process that has attempted to acquire the lock if the number of scheduled operating system activities exceeds a predetermined number, the user process deciding to make the call based on the data in the shared user-operating system memory space, and (ii) the user process makes a second attempt to acquire the lock when the number of scheduled operating system activities does not exceed a predetermined number, the user process deciding to make the second attempt based on the data in the shared user-operating system memory space; and a hardware processor in communication with the user process, wherein the data provided to the shared user-operating system memory space comprises a copy of user-process requests in an I/O queue of the operating system.

16. The system of claim 15, wherein the operating system operates in conjunction with a multiprocessor system.

17. The system of claim 16, wherein the data in the shared user-operating system memory space is indicative of scheduled operating system activities for each processor of the multiprocessor system.

18. A system for utilizing data provided, by an operating system, to shared user-operating system memory space, comprising:

an operating system;

a stored version of data representing a number of actual scheduled operating system activities;

a shared user-operating system memory space comprising data representing a number of operating system activities that is not indicative of the number of actual scheduled operating system activities, the data in the shared user-operating system memory space being operative to represent a greater number of operating system activities than the version of data representing the number of actual scheduled operating system activities, wherein the operating system (i) receives a call from a user process that has attempted to acquire a lock if the number of operating system activities represented by the data to the shared user-operating system memory space exceeds a predetermined number, and (ii) the user process makes a second attempt to acquire the lock when the number of scheduled operating system activities represented by the data to the shared user-operating system memory space does not exceed the predetermined number; and a hardware processor in communication with the user process.

19. The system of claim 18, wherein the operating system operates in conjunction with a multiprocessor system.

20. The system of claim 19, wherein the data in the shared user-operating system memory space represents operating system activities for each processor of the multiprocessor system.

21. The system of claim 18, wherein the data to the shared user-operating system memory space is assessable by a user process to make a determination to call the operating system.

* * * * *